Oct. 13, 1925.                          1,557,524
B. M. W. HANSON
THRUST BEARING
Filed Nov. 20, 1920
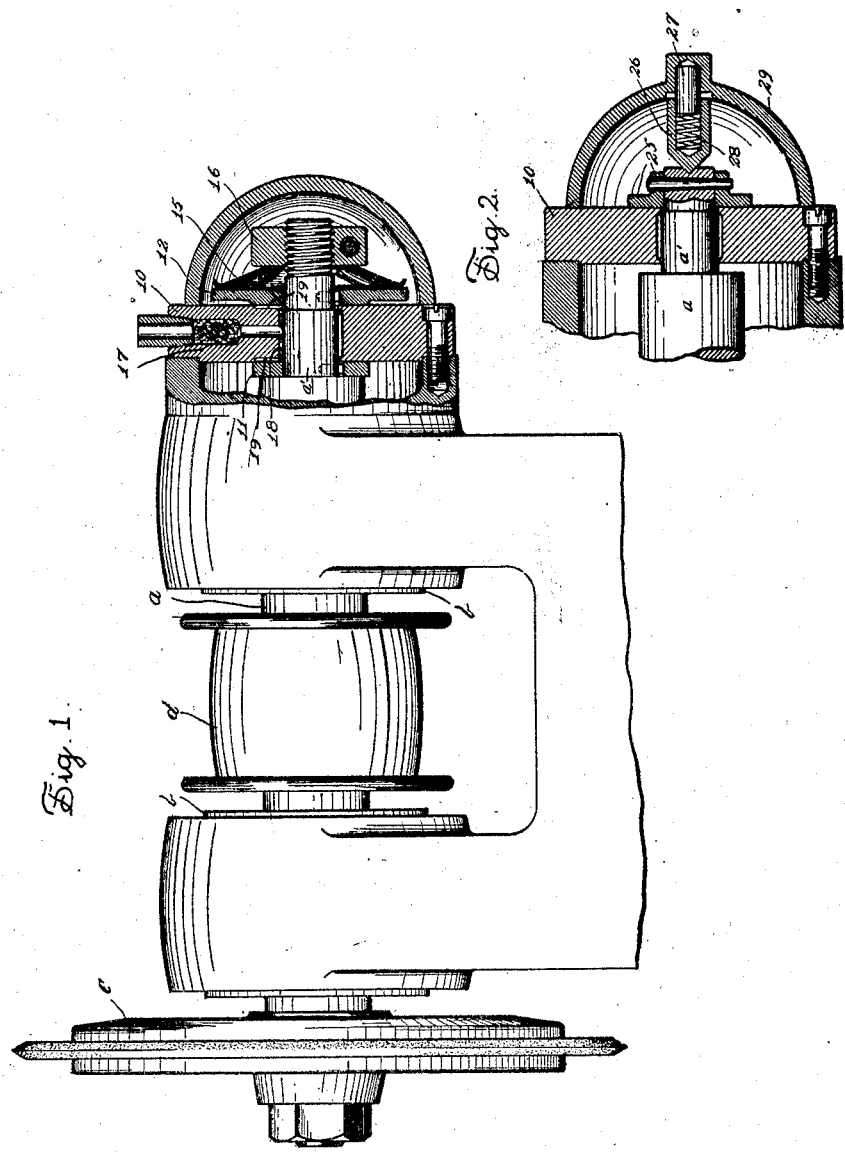
Inventor
Bengt M. W. Hanson.
By
Attorney Patented Oct. 13, 1925.

1,557,524

UNITED STATES PATENT OFFICE.

BENGT M. W. HANSON, OF HARTFORD, CONNECTICUT; EINAR A. HANSON AND CLARENCE E. WHITNEY ADMINISTRATORS OF SAID BENGT M. W. HANSON, DECEASED.

THRUST BEARING.

Application filed November 20, 1920. Serial No. 425,356.

*To all whom it may concern:*

Be it known that I, BENGT M. W. HANSON, a citizen of the United States, and a resident of Hartford, county of Hartford, State of Connecticut, have invented certain new and useful Improvements in a Thrust Bearing, of which the following is a specification.

This invention relates to an improved thrust bearing for rotating parts of machinery and has as its objects to provide an improved structure of this sort by which a rotating part is held against longitudinal movement or vibration, binding action is obviated and expansion or contraction of the parts comprising the thrust bearing and wear of those parts are automatically taken care of. The present invention has peculiar application in connection with rotating parts of machines where precision is required, such as the spindle of a grinding wheel employed, for instance, in the final grinding or finishing operation of a thread. In work of this kind, it is imperative that the grinding wheel run smoothly and without vibration, for slight endwise movement of the wheel will introduce errors which render the work unsuitable for use.

In the accompanying drawing:

Fig. 1 is a view showing, in section, one embodiment of the present invention applied to the spindle of a grinding wheel, and Fig. 2 is a similar view of another embodiment.

Referring to the drawing in detail, $a$ is the spindle rotatably supported by a pair of suitable bearings $b$ and carrying at one end, which projects beyond the bearings $b$, a grinding wheel $c$ the edge of which is shaped in cross section to correspond to that of the thread to be ground. The spindle may be provided between the bearings $b$ with a pulley $d$ for rotating it.

The thrust bearing to which the present invention relates is applied to the opposite end of the spindle, which end may be of reduced diameter as at $a'$. This bearing, in both embodiments shown in the drawings, includes a fixed thrust member or plate 10 which may be secured to one of the bearing housings.

In the illustrative disclosure of Fig. 1, contacting with the inner face of this bearing member or plate 10 is a collar 11 which forms an abutment on the spindle and may be made integral therewith or preferably separate therefrom, as shown, but keyed thereto. Contacting with the outer face of the bearing member or plate 10 is a second collar 12 also keyed to the spindle. Bearing against the outside of the collar 12 is a spring washer 15 which encircles the spindle. The spindle is movable longitudinally through its main bearings and by means of the adjusting nut 16 on the end of the spindle, the collars 11, 12, are brought up into proper contact with the bearing member of plate 10 and the spring 15 put under sufficient tension to hold them in position.

In the embodiment shown in Fig. 2, there is fixed to the spindle $a$ a collar 25 which forms an abutment contacting against the outer face of the bearing member 10. Having a bearing in the outer end of the spindle $a$ is a plunger 26 and between this plunger and a pin 27 is a spring 28. If desired, the spring may be housed within the plunger, as shown, and the plunger may be supported by the pin 27 which is carried by a cap 29 fastened to the plate 10 or otherwise secured in position.

It will be understood that in the embodiments shown and described, the strength of the spring 15 or 28 is slightly greater than any demand which will be put upon the tool, in this instance the grinding wheel, and consequently as the tool is doing its work the spindle will always be held up in place by these springs with the abutments 11 or 25, as the case may be, against the fixed bearing member 10. Thus, endwise movement of the spindle is practically eliminated so that the grinding wheel will run true and cut the work along the correct line without deviation. Expansion or contraction of the member 10 or other parts of the thrust bearing and wear between these parts are taken care of by the springs so as to eliminate any loose play or endwise movement of the spindle. By reducing the end of the spindle, it is possible to reduce the size of the contacting faces of the thrust bearing and so reduce the friction between these parts; and it is also to be noticed that the reduced end of the bearing is smaller than the hole through the fixed bearing plate 10 and eliminates friction at this point.

If desired, the member 10, particularly in the embodiment shown in Fig. 1, may have an oil-duct 17 leading down to a longitudinal groove 18 which communicates with vertical oil grooves 19 in the bearing faces of the member 10. With this arrangement, the oil will be drawn up into the oil grooves 19 by centrifugal action and thus the bearing faces will always be maintained in a properly lubricated condition.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:—

1. In a metal working machine, a spindle rotatably supported in suitable bearings but movable longitudinally therethrough, a grinding wheel fixed to said spindle, a fixed thrust bearing member through which said spindle extends, an abutment on said spindle bearing against one face of said member, a collar on said spindle bearing against the other face of said member, and a spring engaged between said collar and spindle.

2. In a metal working machine, a spindle rotatably supported in suitable bearings but movable longitudinally therethrough, a grinding wheel fixed to said spindle, a fixed thrust bearing member through which said spindle extends, an abutment on said spindle bearing against one side of said member, a collar keyed to said spindle at the other side of said member, a spring engaging said member, and a nut adjustable on said spindle for varying the tension of said spring.

3. In a metal working machine, a longitudinally movable spindle rotatably supported in suitable bearings with its opposite ends projecting beyond said bearings, a grinding wheel secured upon one end of said spindle, a fixed bearing member through which the other end of said spindle projects, an abutment on said spindle bearing against the inner face of said member, a collar keyed on said spindle to the other side of said member, and a spring engaged between said collar and spindle for urging said abutment and collar against said member.

4. In a metal working machine, a spindle rotatably supported in suitable bearings, an apertured bearing member having oil grooves in its bearing faces leading upwardly from said aperture and an oil-duct for feeding oil to said grooves, an abutment on said spindle bearing against one face of said member, a collar keyed on said spindle and bearing against the other face of said member, and a spring between said collar and spindle and urging the same in opposite directions.

5. In a metal working machine, a spindle rotatably supported in suitable bearings and having a shoulder, a fixed thrust bearing member through which said spindle extends, a collar keyed to said spindle between said shoulder and one face of said member, a second collar also keyed to said spindle and engaging against the other face of said member, a nut threaded on the end of said spindle, and a spring washer between said nut and second collar.

BENGT M. W. HANSON.